(12) United States Patent
Matsuoka et al.

(10) Patent No.: US 7,119,309 B2
(45) Date of Patent: Oct. 10, 2006

(54) LIQUID PHASE DIFFUSION BONDING METHOD FOR DISSIMILAR METAL SHEETS AND LIQUID PHASE DIFFUSION BONDING APPARATUS FOR THE SAME

(75) Inventors: Takashi Matsuoka, Sagamihara (JP); Kiyokazu Mori, Atsugi (JP); Yoshiki Seto, Hiratsuka (JP); Tsunetaka Takeuchi, Isehara (JP); Takahiko Kanai, Hadano (JP)

(73) Assignees: Nissan Motor Co., Ltd., Yokohama (JP); Neturen Co., Ltd., Tokyo (JP)

( * ) Notice: Subject to any disclaimer, the term of this patent is extended or adjusted under 35 U.S.C. 154(b) by 0 days.

(21) Appl. No.: 11/054,547

(22) Filed: Feb. 10, 2005

(65) Prior Publication Data

US 2005/0178819 A1  Aug. 18, 2005

(30) Foreign Application Priority Data

Feb. 17, 2004  (JP)  ............................. 2004-039897

(51) Int. Cl.
  *B23K 13/01* (2006.01)
(52) U.S. Cl. ..................................... 219/603; 228/157
(58) Field of Classification Search ................ 219/603, 219/607, 614, 615, 617, 634, 633, 635, 50, 219/148, 154, 645, 612, 611; 228/157, 164, 228/138, 107, 127, 265
See application file for complete search history.

(56) References Cited

U.S. PATENT DOCUMENTS

| | | | | |
|---|---|---|---|---|
| 2,914,641 | A | * | 11/1959 | Yuhasz ...................... 219/611 |
| 3,436,805 | A | | 4/1969 | Friske et al. |
| 6,389,697 | B1 | | 5/2002 | Benoit et al. |

FOREIGN PATENT DOCUMENTS

| | | | | |
|---|---|---|---|---|
| JP | 55165291 | A | * | 12/1980 |
| JP | 10180463 | A | * | 7/1998 |
| JP | 2004-122171 | A | | 4/2004 |

\* cited by examiner

*Primary Examiner*—Quang Van
(74) *Attorney, Agent, or Firm*—Foley & Lardner LLP

(57) ABSTRACT

A liquid phase diffusion bonding method for dissimilar metal sheets by allowing a galvanized steel sheet and an aluminum alloy sheet to come into close contact with each other and pressing both sheets by using a first mold of a liquid phase diffusion bonding apparatus and a second mold of the same; and heating the sheets at approximately the same heat-up rate and at approximately the same temperature to perform liquid phase diffusion bonding of the sheets by using induction heat generated by applying high frequency currents to a first high frequency induction heating coil provided on the first mold and a second high frequency induction heating coil provided on the second mold. The first high frequency induction heating coil and the second high frequency induction heating coil are positioned to sandwich the sheets at predetermined distances from the sheets, respectively.

4 Claims, 5 Drawing Sheets

CO1: ALUMINUM ALLOY SHEET

CO2: STEEL SHEET

LIQUID PHASE DIFFUSION BONDING METHOD FOR DISSIMILAR METAL SHEETS AND LIQUID PHASE DIFFUSION BONDING APPARATUS FOR THE SAME

BACKGROUND OF THE INVENTION

1. Field of the Invention

The present invention relates to a method and an apparatus enabling two dissimilar metal sheets with different physical properties to be bonded together by liquid phase diffusion bonding. Specifically, the present invention relates to a liquid phase diffusion bonding technique enabled to ensure sufficient bonding strength for a short period of time without using inert gas.

2. Description of the Related Art

It is widely known that, where dissimilar metal materials such as iron and aluminum are welded together, an intermetallic compound is generated at the bonding interface, resulting in insufficient bonding strength.

An example of means for boding such dissimilar metal materials is a liquid phase diffusion bonding method which ensures predetermined bonding strength. (See *Joining of An Iron Pipe to An Aluminum Pipe by Zinc Plating*, Quarterly Journal of the Japan Welding Society, Vol. 18, No. 4, pp. 572–579, 2000.)

The method described in the above document is as follows: an iron pipe with a tapered end is electro-plated with zinc; the iron pipe is inserted into an aluminum pipe and heated to predetermined temperature; and the iron pipe is further pushed into the aluminum pipe so that the pipes are bonded together by liquid phase diffusion.

This liquid phase diffusion bonding has the following mechanism. First, the iron pipe and the aluminum pipe are heated up over 381° C. (the eutectic temperature of zinc and aluminum), and the iron pipe is inserted into the aluminum pipe. When the iron pipe is inserted into the aluminum pipe, the end of the aluminum pipe is rubbed against the iron pipe so the new surfaces of both pipes come into contact with each other, thus aluminum and zinc react forming an eutectic liquid. This eutectic liquid accelerates a diffusion reaction of aluminum, zinc and iron, so that the pipes are bonded.

Another example of means for bonding dissimilar metal materials is to press two or more heated dissimilar metal sheets by using a pressure roller to bond them together. This bonding method is employed in manufacturing cladding material.

SUMMARY OF THE INVENTION

However, it is difficult to apply the above-mentioned pressure-applying bonding method using a pressure roller to bonding of metal sheets having complex three-dimensional curved shapes such as car parts.

On the other hand, where such car parts are manufactured using the bonding method described in the document mentioned earlier, bonding needs to be done within cycle time. It is thus necessary to reduce bonding time. In addition, where this bonding method described in the document is used to bond thin metal sheets together, pressing and heating conditions need to be clarified to ensure sufficient boding strength.

The present invention was accomplished in order to resolve these problems. An object thereof is to provide reliable method and apparatus for liquid phase diffusion bonding of dissimilar metal sheets, the method and apparatus being enabled to achieve reduced bonding time and ensure sufficient bonding strength.

The first aspect of the present invention provides a liquid phase diffusion bonding method for dissimilar metal sheets comprising: allowing a galvanized steel sheet and an aluminum alloy sheet to come into close contact with each other and pressing both sheets by using a first mold of a liquid phase diffusion bonding apparatus and a second mold of the same; and heating the galvanized steel sheet and the aluminum alloy sheet at approximately the same heat-up rate and at approximately the same temperature to perform liquid phase diffusion bonding of the sheets by using induction heat generated by applying high frequency currents to a first high frequency induction heating coil provided on the first mold and a second high frequency induction heating coil provided on the second mold, the first high frequency induction heating coil and the second high frequency induction heating coil being positioned to sandwich the galvanized steel sheet and the aluminum alloy sheet at predetermined distances from the sheets, respectively.

The second aspect of the present invention provides a liquid phase diffusion bonding apparatus comprising: a first mold; a second mold; a pressure-applying device which enables at least any one of the first mold and the second mold to be moved and presses a galvanized steel sheet and an aluminum alloy sheet, both fixed between the first mold and the second mold; a first high frequency induction heating coil which is provided on the first mold at a position a predetermined distance away from the galvanized steel sheet and applies a high frequency current to generate an induction current through the galvanized steel sheet so that the galvanized steel sheet is heated; and a second high frequency induction heating coil which is provided on the second mold at a position a predetermined distance away from the aluminum alloy sheet and applies a high frequency current to generate an induction current through the aluminum alloy sheet so that the aluminum alloy sheet is heated.

The third aspect of the present invention provides a liquid phase diffusion bonding apparatus comprising: a first mold; a second mold; pressure-applying means for enabling at least any one of the first mold and the second mold to be moved and presses a galvanized steel sheet and an aluminum alloy sheet, both fixed between the first mold and the second mold; a first high frequency induction heating coil which is provided on the first mold at a position a predetermined distance away from the galvanized steel sheet and applies a high frequency current to generate an induction current through the galvanized steel sheet so that the galvanized steel sheet is heated; and a second high frequency induction heating coil which is provided on the second mold at a position a predetermined distance away from the aluminum alloy sheet and applies a high frequency current to generate an induction current through the aluminum alloy sheet so that the aluminum alloy sheet is heated.

BRIEF DESCRIPTION OF THE DRAWINGS

The invention will now be described with reference to the accompanying drawings wherein.

DETAILED DESCRIPTION OF THE PREFERRED EMBODIMENT

A specific embodiment where the present invention is applied is detailed below with reference to the drawings.

(Construction of Liquid Phase Diffusion Bonding Apparatus for Dissimilar Metal Sheets)

A liquid phase diffusion bonding apparatus for dissimilar metal sheets according to the present invention is described.

Figure 1:
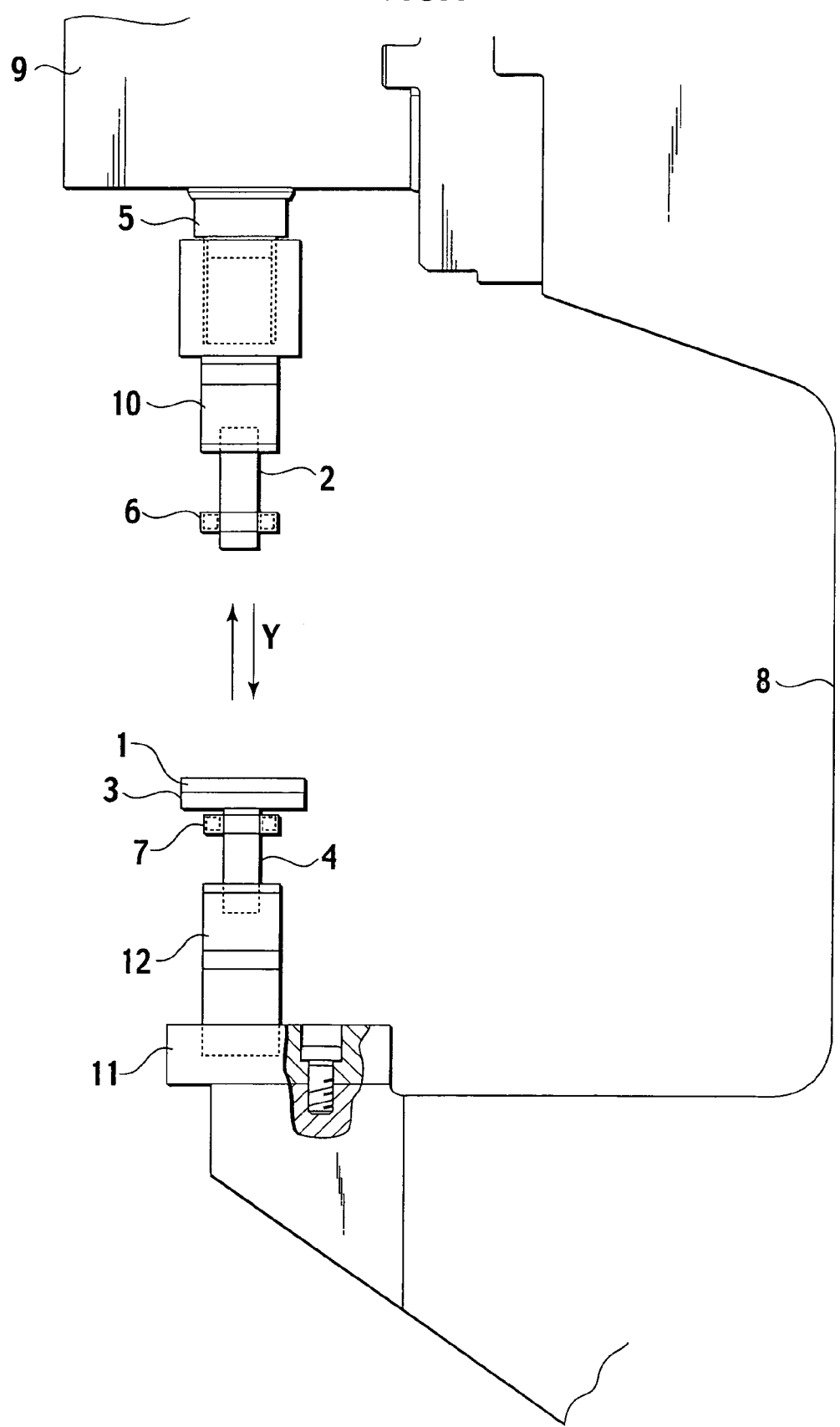
FIG. 1 is a side view of a liquid phase diffusion bonding apparatus according to an embodiment.

As shown in FIG. 1, the liquid phase diffusion bonding apparatus of this embodiment has a first mold 2 and a second mold 4. The first mold 2 presses a galvanized steel sheet 1 which is one of two dissimilar metal sheets with different physical properties, and the second mold 4 presses an aluminum alloy sheet 3 which is the other one of the dissimilar metal sheets. This apparatus also has a hydraulic cylinder 5 (a pressure-applying device) which can move the first mold 2 closer to and away from the second mold 4, in other words, in a vertical direction shown by the arrow Y in FIG. 1 so that the galvanized steel sheet 1 and the aluminum alloy sheet 3, both fixed between the molds, are pressed against each other.

Figure 2A:
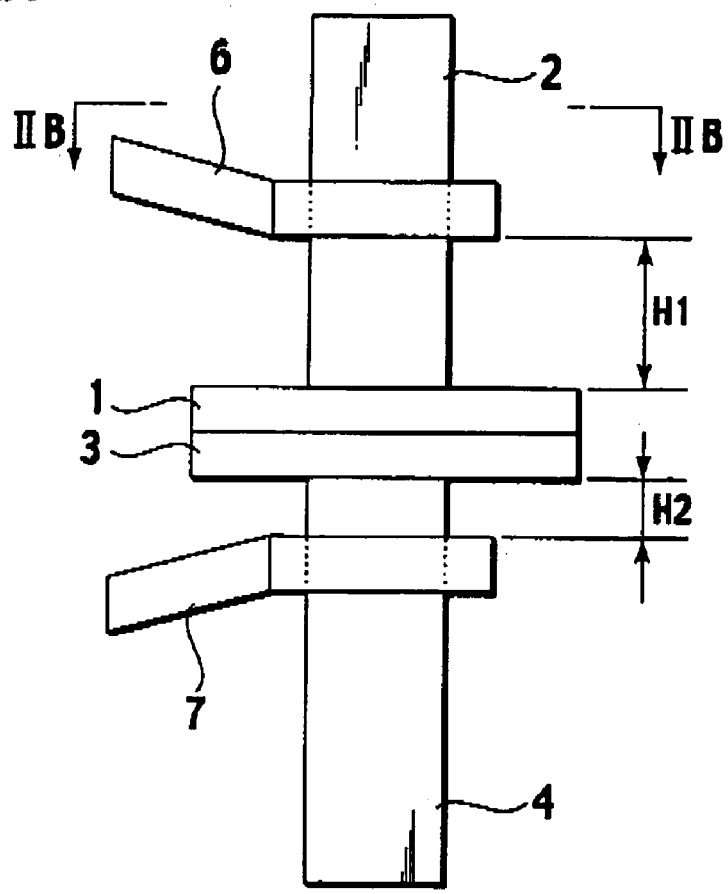
FIG. 2A is an enlarged view of a bonding portion of the liquid phase diffusion bonding apparatus according to the embodiment.
Figure 2B:
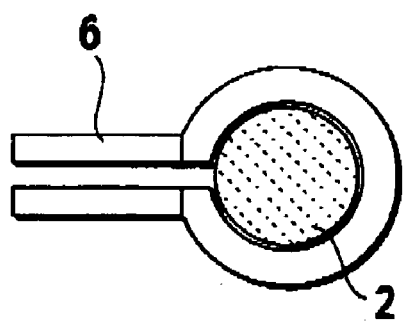
FIG. 2B is a cross-sectional view taken along the line IIB—IIB in FIG. 2A.

Further, as shown in FIGS. 2A and 2B, the apparatus has a first high frequency induction heating coil 6 which is a device for heating the galvanized steel sheet 1 and a second high frequency induction heating coil 7 which is a device for heating the aluminum alloy sheet 3. The first high frequency induction heating coil 6 is provided on the first mold 2 at a position a predetermined distance H1 away from the galvanized steel sheet 1, and applies a high frequency current to generate an induced current in the galvanized steel sheet 1 so that the galvanized steel sheet 1 is heated. Meanwhile, the second high frequency induction heating coil 7 is provided on the second mold 4 at a position a predetermined distance H2 away from the aluminum alloy sheet 3, and applies a high frequency current to generate an induced current through the aluminum alloy sheet 3 so that the aluminum alloy sheet 3 is heated.

The first mold 2 is fixed to a mold holding member 10. The mold holding member 10 is attached to an upper stage 9 through the hydraulic cylinder 5. The upper stage 9 is formed in the upper end portion of an apparatus base 8 having an approximate C shape in side view. The first mold 2 can be moved by the hydraulic cylinder 5 in the vertical direction as shown in the arrow Y in FIG. 1. The second mold 4 is fixed to a mold holding member 12 fixed to a lower stage 11 formed in the lower end portion of the apparatus base 8. As shown in FIG. 2B, the first and second molds 2 and 4 are both made of a highly-rigid ceramic round bar having a cylindrical column shape.

Non-illustrated jigs are used as fixing devices to fix the galvanized steel sheet 1 and aluminum alloy sheet 3 between the first and second molds 2 and 4.

The first high frequency induction heating coil 6 is fixed at a position the predetermined distance H1 away from the end of the first mold 2. The first high frequency induction heating coil 6 is formed by a coil wire wound into a toric shape, and the round bar-shaped first mold 2 is passed through a through-hole of the coil so that the coil is attached to the first mold 2. The first high frequency induction heating coil 6 is supported by a non-illustrated support bracket whose one end is fixed to the apparatus base 8. By moving this support bracket, an attached position of the first high frequency induction heating coil 6 relative to the first mold 2 can be adjusted.

Similarly to the first high frequency induction heating coil 6, the second high frequency heating coil 7 is formed by a coil wire wound into a toric shape, and the second mold 4 is passed through a through-hole thereof so that the coil is attached to the second mold 4. Further, the second high frequency induction heating coil 7 is fixed at a position the predetermined distance H2 away from the end of the second mold 4. An attached position of the second high frequency induction heating coil 7 relative to the second mold 4 can also be adjusted by moving a support bracket.

Where an output to these heating coils is 14 kW, it is preferred that the distance H1 from the first high frequency induction heating coil 6 to the end of the first mold 2 be 4.5 mm and that the distance H2 from the second high frequency induction heating coil 7 to the end of the second mold 4 be 0.5 mm. By setting the distances H1 and H2 as above, the galvanized steel sheet 1 and the aluminum alloy sheet 3 can be heated at approximately the same heat-up rate and at approximately the same temperature.

Appropriate high frequency currents are applied to the first high frequency induction heating coil 6 and the second high frequency induction heating coil 7, respectively, by a non-illustrated current supplying device.

(Liquid Phase Diffusion Bonding Method for Dissimilar Metal Sheets)

Next, a liquid phase diffusion bonding method for dissimilar metal sheets according to this embodiment is described with reference to the drawings.

First of all, the aluminum alloy sheet 3 is fixed so that the sheet comes into contact with the end of the second mold 4, and the galvanized steel sheet 1 is laid on the aluminum alloy sheet 3 and fixed. The non-illustrated jigs are used to fix these sheets. In this embodiment, the galvanized steel sheet 1 with a thickness of 0.8 mm and the aluminum alloy sheet 3 with the thickness of 2.0 mm are used.

Next, the hydraulic cylinder 5 is actuated to move the first mold 2 on the galvanized steel sheet 1 side closer to the second mold 4 on the aluminum alloy sheet 3 side. The end of the first mold 2 is allowed to come into contact with the galvanized steel sheet 1 so that the galvanized steel sheet 1 comes into close contact with the aluminum alloy sheet 3. Thereafter, the galvanized steel sheet 1 and the aluminum alloy sheet 3 are pressed at predetermined pressure, and high frequency currents are applied to the first and second high frequency induction heating coils 6 and 7 to heat up the galvanized steel sheet 1 and the aluminum alloy sheet 3 at approximately the same heat-up rate at approximately the same temperature.

Once high frequency currents are applied to the first and second high frequency induction heating coils 6 and 7, alternating magnetic fluxes are generated, and these fluxes pass through the galvanized steel sheet 1 and the aluminum alloy sheet 3, respectively, inducing eddy currents with very high densities. The eddy current heat up the bonded surface of the galvanized steel sheet 1 and the aluminum alloy sheet 3.

Pressure to be applied to the galvanized steel sheet 1 and the aluminum alloy sheet 3 by the first and second molds 2 and 4 ranges from 15 MPa to 120 MPa, more preferably from 20 MPa to 80 MPa. When heating up the galvanized steel sheet 1 and the aluminum alloy sheet 3 at approximately the same heat-up rate and at approximately the same temperature, interface temperature at the bonded portion is to be set at 370 to 550° C., more preferably at 450 to 550° C.

When dissimilar metal sheets are actually bonded, there exists an optimal temperature range for each pressure applied to a contact portion between these dissimilar metal sheets. Therefore, temperature appropriate for each bonding pressure is to be selected. In deciding bonding conditions, a desired value of bonding strength is substituted by a desired value of a tension shear load of 2.0 mm-thick aluminum alloy sheets bonded together by spot welding, assuming that this makes possible to obtain a practical range of strength.

Figure 4:
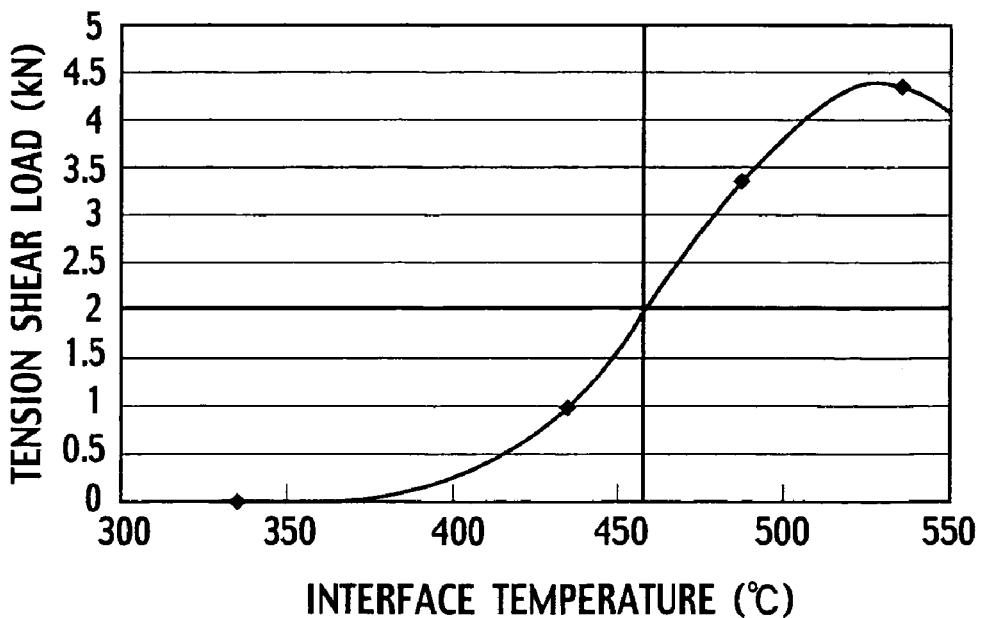
FIG. 4 is a view showing a relationship between a tension shear load and interface temperature at a bonded portion of a galvanized steel sheet and an aluminum alloy sheet.

As is evident from FIG. 4, as the interface temperature of the bonded portion of the galvanized steel sheet 1 and the aluminum alloy sheet 3 increases to temperature above 370° C., a tension shear load increases. Therefore, it is preferred that the interface temperature of the bonded portion is between 370 and 550° C. in which sufficient tension shear load is ensured. When the interface temperature of the bonded portion is lower than 370° C., tension shear load cannot be ensured. When the interface temperature of the bonded portion is over 550° C., the thicknesses of the sheets are reduced due to the excessively high temperature, causing lower strength and deformation of base materials. In this embodiment, high frequency currents are applied to the first and second high frequency induction heating coils 6 and 7 so that the interface temperature of the bonded portion becomes 530° C.

Figure 5:
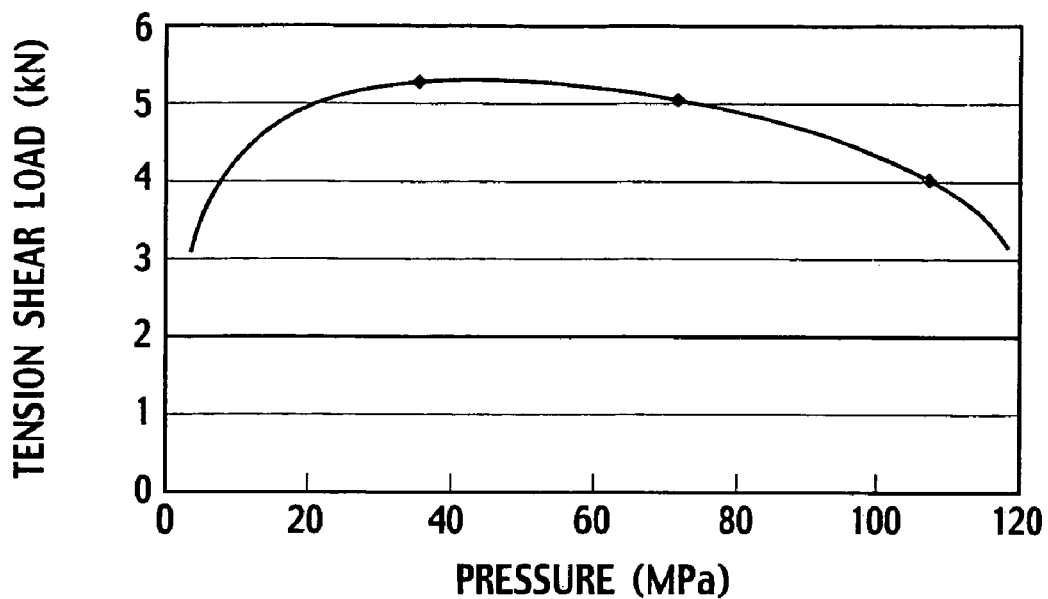
FIG. 5 is a view showing a relationship between pressure applied to the bonded portion and a tension shear load.

As is evident from FIG. 5, sufficiently high tension shear load is obtained with a wide range of pressure applied to the bonded portion, from 15 MPa to 120 MPa. In particular, at pressure between 20 MPa and 80 MPa, very high tension shear load is obtained. When the pressure applied to the bonded portion is less than 15 MPa, bonding strength cannot be ensured due to a lack of applied pressure. When the pressure applied to the bonded portion exceeds 120 MPa, the materials are deformed greatly and local thicknesses of the sheets become too small.

Figure 6:
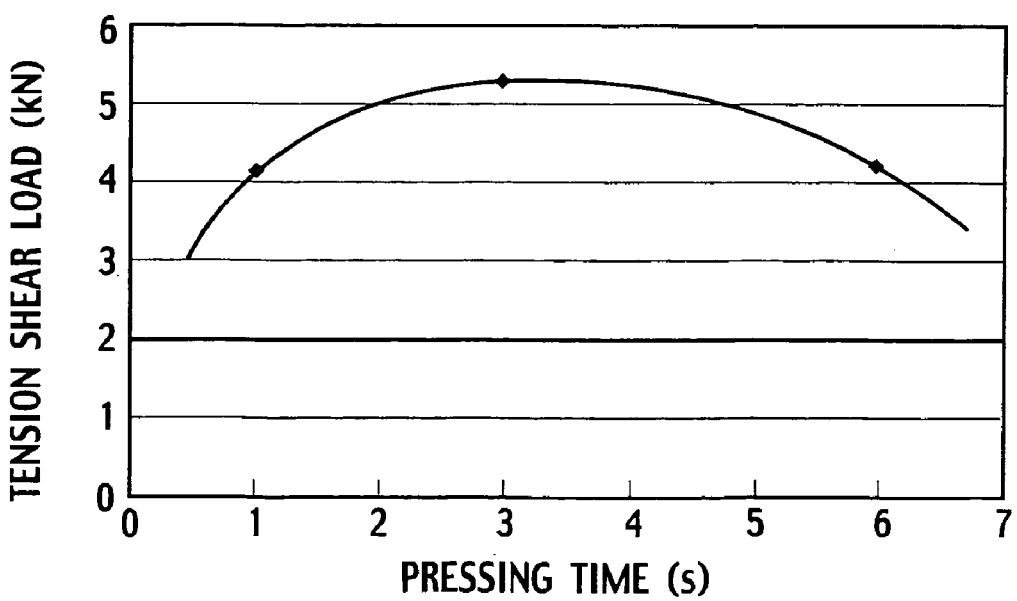
FIG. 6 is a view showing a relationship between time of pressing the bonded portion and a tension shear load.

Duration of pressing the bonded portion is preferably between 1 to 7 seconds since sufficient tension shear load can be obtained by pressing for only 1 second as evident from FIG. 6. Considering the fact that the pressing time exceeding 7 seconds reduces a tension shear load, it is preferred that upper limit of the pressing duration be set to 7 seconds.

Figure 3:
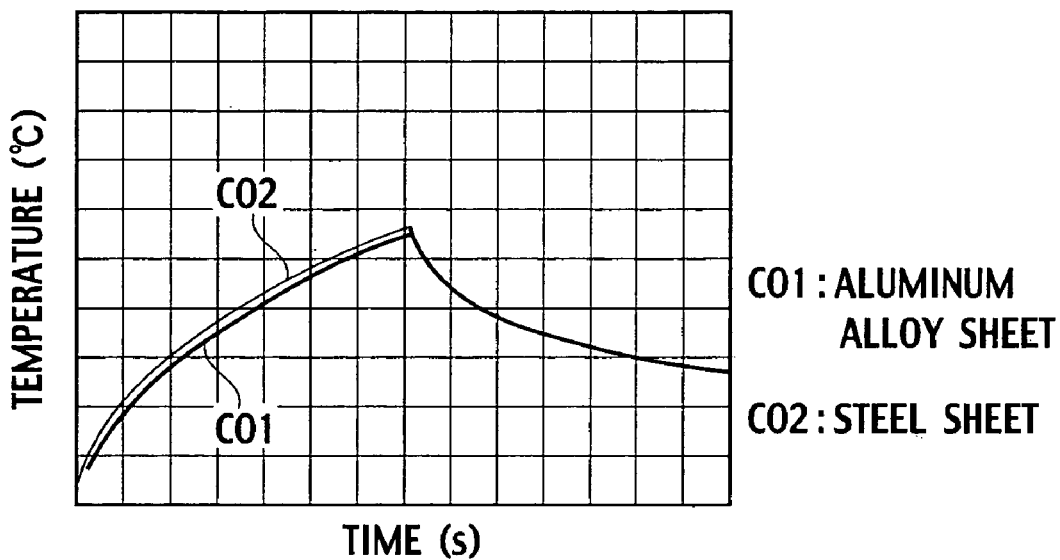
FIG. 3 is a view showing curves of temperature rise by high frequency induction heating.
Figure 7A:
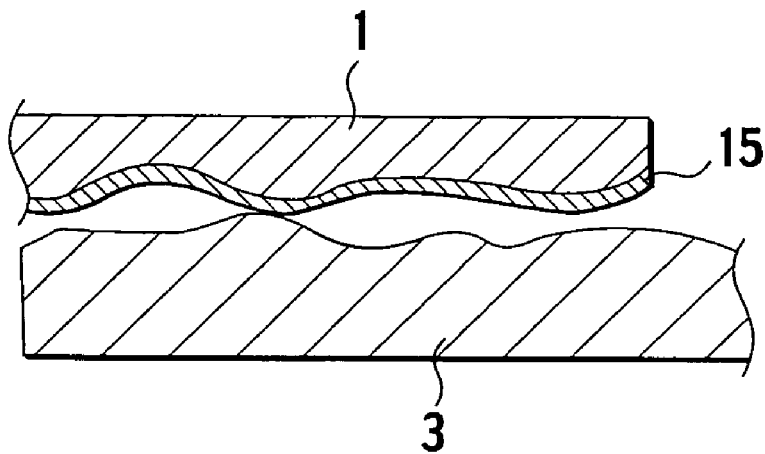
FIGS. 7A to 7C are schematic views showing how liquid phase diffusion bonding takes place at the bonded portion.
Figure 7B:
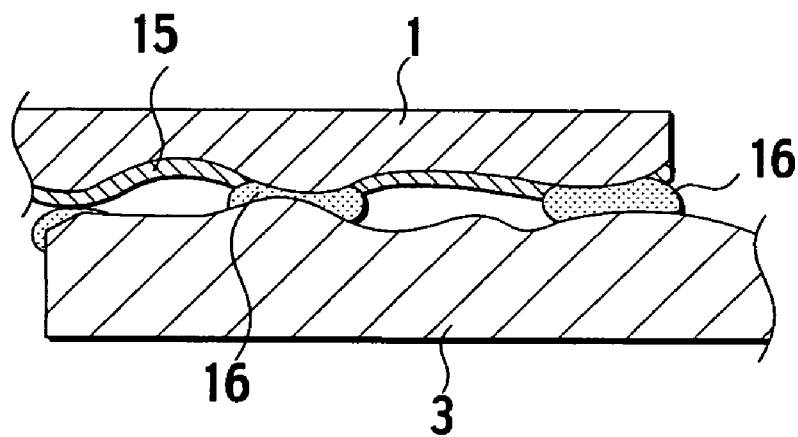
Figure 7C:
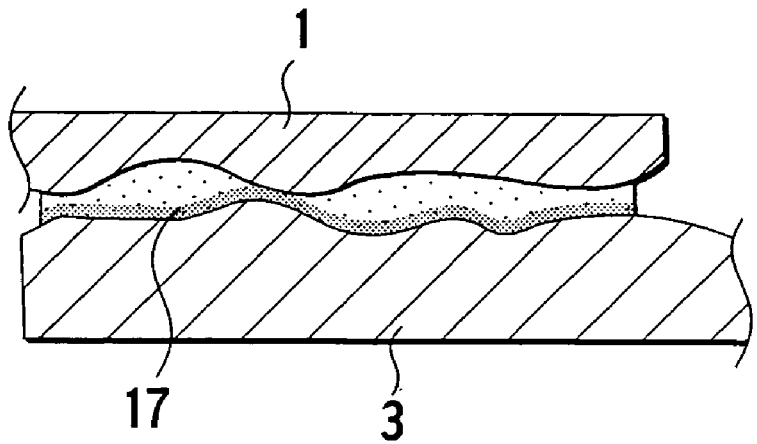

When the galvanized steel sheet 1 and the aluminum alloy sheet 3 are pressed under the above-described conditions, the galvanized steel sheet 1 and the aluminum alloy sheet 3 are heated up by induction heating at approximately the same temperature as shown in FIG. 3. As shown in FIGS. 7A to 7C, at the interface of the bonded portion, zinc contained in a galvanized layer 15 formed on the galvanized steel sheet 1 and aluminum of the aluminum alloy sheet 3 react, forming an eutectic liquid phase 16. This eutectic liquid phase 16 accelerates a diffusion reaction in an Al—Zn—Fe phase 17, thus the sheets are bonded together. Note that, in FIG. 3, CO1 represents central temperature of a portion of the aluminum alloy sheet 3 pressed by the second mold 4 and CO2 represents central temperature of a portion of the galvanized steel sheet 1 pressured by the first mold 2.

As described so far, according to this embodiment, the sheets can be heated in a short period of time as shown in FIG. 6, enabling a significant reduction of time required until generation of a eutectic liquid of aluminum and zinc. Furthermore, even if bonding time apart from heating time can be as short as 1 second, it is possible to produce a sufficiently high tension shear load because of the bonding mechanism of a eutectic liquid of aluminum, zinc and iron. Moreover, by increasing outputs from a power source that supplies high frequency currents to the first and second high frequency induction heating coils 6 and 7, time for heating the galvanized steel sheet 1 and the aluminum alloy sheet 3 can be reduced. Hence, with the bonding method of the present invention, cycle time as short as that of spot welding can be achieved.

Where a direct heating method is used as means for bonding the galvanized steel sheet 1 and the aluminum alloy sheet 3, the base materials are heated by transferred heat from a heating source. Therefore, it takes about 3 minutes until the temperature of the sheets increases from room temperature to 500° C. However, the use of the induction heating method as described in the embodiment enables the dissimilar metal sheets to be bonded together in an extremely short period of time while ensuring sufficient bonding strength as described earlier.

As mentioned above, in this embodiment, the dissimilar metal sheets can be heated in a short period of time in comparison with heating by the direct heating method. Therefore, the bonding interface is prevented from being oxidized and inert gas is no longer necessary. Inert gas is not necessary because a eutectic liquid of the galvanized steel sheet 1 and the aluminum alloy sheet 3 is generated at interface temperature of about 400° C., and the interface between the steel sheet and the aluminum alloy sheet becomes wet with the eutectic liquid, preventing oxidization of the interface. Hence, in this embodiment, bonding in the atmosphere is feasible without a need for anti-oxidant shielding gas. Because shielding gas spray nozzle is also no longer necessary, the structure of the liquid phase diffusion bonding apparatus can be simplified.

Moreover, according to the embodiment, dissimilar metal sheets can be bonded together at low pressure, which can prevent a reduction of strength and deformation of base materials due to reduced thicknesses. Since heating temperature is low, a reduction of strength of the base materials caused by a thermal effect can also be prevented.

The specific embodiment to which the present invention is applied has been described. However, the present invention is not limited to this embodiment and can be modified without departing from the principle of the present invention.

For example, in the above-describe embodiment, only the first mold 2 can be moved by the hydraulic cylinder 5. However, the second mold 4 can also be moved by a hydraulic cylinder similarly to the first mold 2.

The entire content of a Japanese Patent Application No. P2004-039897 with a filing date of Feb. 17, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A liquid phase diffusion bonding method for dissimilar metal sheets, comprising:

allowing a galvanized steel sheet and an aluminum alloy sheet to come into close contact with each other and pressing both sheets by using a first mold of a liquid phase diffusion bonding apparatus and a second mold of the same; and heating the galvanized steel sheet and the aluminum alloy sheet at approximately the same heat-up rate and at approximately the same temperature to perform liquid phase diffusion bonding of the sheets by using induction heat generated by applying high frequency currents to a first high frequency induction heating coil provided on the first mold and a second high frequency induction heating coil provided on the second mold, the first high frequency induction heating coil and the second high frequency induction heating coil being positioned to sandwich the galvanized steel sheet and the aluminum alloy sheet at predetermined distances from the sheets, respectively.

2. A liquid phase diffusion bonding method according to claim 1, wherein bonding pressure applied to the galvanized steel sheet and the aluminum alloy sheet is within a range from 15 MPa to 120 MPa, and interface temperature at a bonded portion of the galvanized steel sheet and the aluminum alloy sheet is within a range from 370 to 550° C.

3. A liquid phase diffusion bonding apparatus, comprising:

a first mold;

a second mold;

a pressure-applying device which enables at least any one of the first mold and the second mold to be moved and presses a galvanized steel sheet and an aluminum alloy sheet, both fixed between the first mold and the second mold;

a first high frequency induction heating coil which is provided on the first mold at a position a predetermined distance away from the galvanized steel sheet and applies a high frequency current to generate an induction current through the galvanized steel sheet so that the galvanized steel sheet is heated; and a second high frequency induction heating coil which is provided on the second mold at a position a predetermined distance away from the aluminum alloy sheet and applies a high frequency current to generate an induction current through the aluminum alloy sheet so that the aluminum alloy sheet is heated.

4. A liquid phase diffusion bonding apparatus, comprising:

a first mold;

a second mold;

pressure-applying means for enabling at least any one of the first mold and the second mold to be moved and presses a galvanized steel sheet and an aluminum alloy sheet, both fixed between the first mold and the second mold;

a first high frequency induction heating coil which is provided on the first mold at a position a predetermined distance away from the galvanized steel sheet and applies a high frequency current to generate an induction current through the galvanized steel sheet so that the galvanized steel sheet is heated; and a second high frequency induction heating coil which is provided on the second mold at a position a predetermined distance away from the aluminum alloy sheet and applies a high frequency current to generate an induction current through the aluminum alloy sheet so that the aluminum alloy sheet is heated.

* * * * *